United States Patent

[11] 3,609,024

| [72] | Inventor | Shigeru Suzuki<br>Kanagawa-ken, Japan |
|---|---|---|
| [21] | Appl. No. | 806,843 |
| [22] | Filed | Mar. 13, 1969 |
| [45] | Patented | Sept. 28, 1971 |
| [73] | Assignee | Kabushiki Kaisha Ricoh<br>Tokyo, Japan |
| [32] | Priority | Mar. 19, 1968 |
| [33] | | Japan |
| [31] | | 43/18,142 |

[54] SLIT EXPOSURE DEVICE
3 Claims, 3 Drawing Figs.

[52] U.S. Cl. .................................................. 355/51, 355/60, 355/66
[51] Int. Cl. .............................................. G03b 27/70
[50] Field of Search ........................................ 355/51, 57, 60, 65, 66

[56] References Cited
UNITED STATES PATENTS
3,330,181 7/1967 Jakobson ........................ 355/66 X
3,364,816 1/1968 Jeffree .......................... 355/51
3,431,053 3/1969 Wick et al. ..................... 355/66

*Primary Examiner*—Samuel S. Matthews
*Assistant Examiner*—Richard A. Wintercorn
*Attorney*—Burgess, Ryan and Hicks ABSTRACT: A slit exposure device comprising a stationary original holder and a slit for exposure and a movable optical system for directing to the slit the light from the original. This optical system includes a photocopying lens having a reflecting mirror integrally disposed at the rear surface of the lens, a V-shaped reflecting mirror having two reflecting surfaces and a movable reflecting mirror adapted to impinge upon the lens the light from the original, and the V-shaped reflecting mirror and a stationary reflecting mirror to impinge the light emanating from the lens to the slit. The lens moves in the direction normal to and parallel with the original at a speed one-half of that of a photocopying paper while the V-shaped and movable reflecting mirrors move in parallel with the original at speeds one-half and equal to that of the copying paper respectively.

PATENTED SEP 28 1971  3,609,024

INVENTOR
SHIGERU SUZUKI
BY Burgess, Ryan + Hicks
ATTORNEYS 3,609,024

SLIT EXPOSURE DEVICE

BACKGROUND OF THE INVENTION

The present invention relates to a slit exposure device and more particularly to a slit exposure device best suited for use in a photocopying machine or the like.

Known is a slit exposure device in which an exposure device having a slit exposure optical system is displaced between an original and a light-sensitive sheet material (referred to as photocopying paper hereinafter) both of which are held in stationary position. In the prior art device of the type described, a device is for advancing the photocopying paper to its exposure position and holding the paper in this position during exposure with a photocopying supporting stand having a relatively large area for supporting the photocopying paper in as much planar state as possible. Therefore, the mechanism for advancing and stopping the photocopying paper which is complicated in construction and tedious in operation and the mechanism for stationarily holding in planar position the photocopying paper are required. The above described members and mechanisms present problems in the attempts for making the photocopying machine or the like, compact in size, light in weight and efficient in operation.

The primary object of the present invention is to provide a slit exposure device which can eliminate the defects of the conventional device by effecting the slit exposure upon a moving photocopying paper whereby the photocopying operation can be more effectively carried out and the (optical) relative position between the original and a photocopying paper can be easily effected.

SUMMARY OF THE INVENTION

In brief, according to the present invention, an original holder and an exposure slit are held stationarily; a photocopying paper is advanced in contact with and across the slit; and the optical system for focusing the image of the original upon the photosensitive paper is displaced during photocopying. The above optical system comprises a photocopying lens having a reflecting mirror disposed at the rear surface of the lens, a V-shaped reflecting mirror having two reflecting surfaces, one movable reflecting mirror and one stationary reflecting mirror. The two reflecting surfaces of the V-shaped reflecting mirror, that is the intersecting edge of this mirror is directed toward the photocopying lens. One of the two reflecting surfaces of the V-shaped reflecting mirror is also in opposed relation with the reflecting surface of the movable mirror in turn is disposed in opposed relation with the original holder, hence the original. The other reflecting surface of the V-shaped reflecting mirror is disposed in opposed relation with the reflecting surface of the stationary reflecting mirror which in turn is opposed to the slit for exposure of the photocopying paper. The light emanating from the original surface is impinged upon the photocopying lens through the movable reflecting mirror and the reflecting surface in opposed relation thereto of the V-shaped reflecting mirror. The light impinged upon the lens is further reflected by the reflecting mirror disposed at the rear surface of this lens and impinged upon the reflecting surface of the V-shaped reflecting mirror in opposed relation with the stationary reflecting mirror and then reflected by this stationary mirror and focused upon the moving photocopying paper through the slit.

The above photocopying lens, the movable reflecting mirror, and the V-shaped reflecting mirror are displaced in predetermined relation with one another so that the optical length between the original surface and the lens can be maintained always equal to the optical length between the lens and the surface of the photocopying paper. In this case it is essential that the movable reflecting mirror moves in parallel with the original at the same speed with that of the photosensitive paper advanced across the slit.

The above and other objects, features and advantages of the present invention will become more apparent from the following description taken in conjunction with the accompanying drawing.

DESCRIPTION OF THE PREFERRED EMBODIMENT

Figure 1:
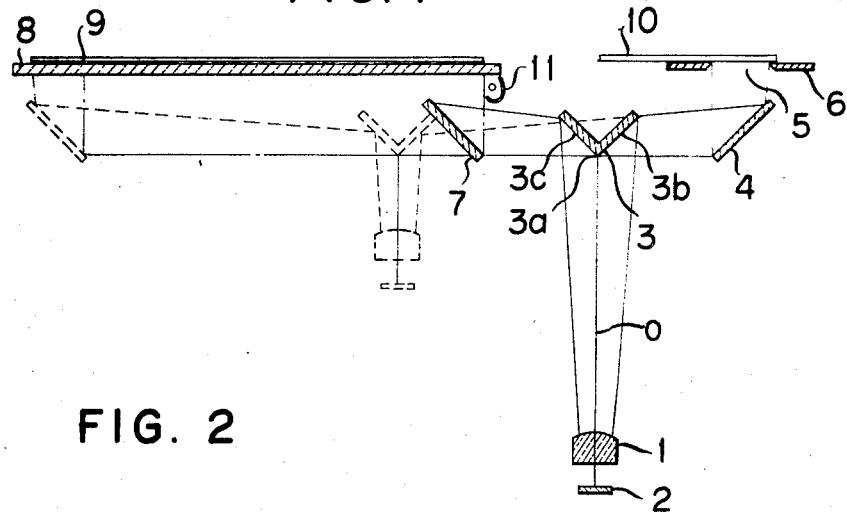
FIG. 1 is a sectional view of a slit exposure optical system of one embodiment of the present invention.
Figure 2:
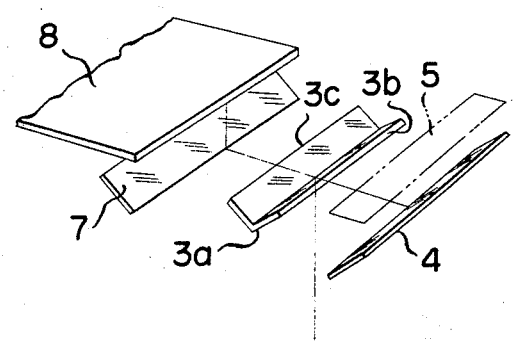
FIG. 2 is a perspective view thereof.

Referring particularly to FIGS. 1 and 2, at the rear surface of a photocopying lens 1 is integrally disposed a reflecting mirror 2. On the other side of the copying lens 1 remote from the reflecting mirror 2 is disposed a V-shaped reflecting mirror 3 having two reflecting mirror surfaces 3b and 3c. The intersecting line or edge 3a of these two reflecting surfaces is disposed at a right angle relative to the optical axis of the copying lens 1, and the reflecting surfaces 3b and 3c are inclined at 135° relative to the optical axis O. Upon a plane in opposed and parallel relation with the reflecting surface 3b of the reflecting mirror 3 is disposed in stationary position a reflecting mirror 4 with its reflecting surface being directed to the reflecting surface 3b. Upon a plane beyond the reflecting mirror 3 and at a right angle relative to the optical axis 0 of the copying lens 1 is held stationarily a shielding plate 6. This shielding plate 6 has an elongated slit 5 disposed in parallel with an imaginary plane containing both of the optical axis 0 and the edge 3a of the reflecting mirror 3. On the side of the reflecting mirror 3 opposite to the side of the reflecting mirror 4 is disposed a movable reflecting mirror 7 in a plane parallel with the reflecting surface 3c of the reflecting mirror and at 45° relative to the optical axis of the copying lens 1. The reflecting surface of the reflecting mirror 7 is directed toward and moved toward and away from the reflecting surface 3c of the reflecting mirror 3. A transparent original holder 8 is disposed in a plane at a right angle to the optical axis of the copying lens 1 in opposed relation with the reflecting mirror 7.

Upon the surface of the original holder 8 opposite to the surface thereof directed toward the reflecting mirror 7 is placed an original 9 to be copied with the image thereof being directed toward the reflecting mirror 7. Upon the surface of the shielding plate 6 opposite to the reflecting mirror 4 is placed a photocopying paper 10 with its light sensitized surface directed toward the reflecting mirror 4. An illumination lamp 11 is disposed in the vicinity of the original holder 8 on the side of the copying lens 1, and illuminates the original 9. The reflected lights are made to impinge upon the copying lens 1 through the movable reflecting mirror 7 and the V-shaped reflecting mirror 3, that is its reflecting surface 3c. On the other hand, the light emanating from the copying lens 1 is made to impinge upon the light sensitized surface of the photocopying paper through the V-shaped reflecting mirror, that is its reflecting surface 3b, the reflecting mirror 4 and the slit 5, thereby focusing the image of the original 9 upon the photocopying paper 10. In this case in order to correctly focus the image upon the photocopying paper 10 without any deviation and distortion, the copying lens 1, the V-shaped reflecting mirror 3 and the movable reflecting mirror 7 are displaced while maintaining the above arrangement. That is, the photocopying lens 1 is displaced in such a manner that the vertex of the lens 1, that is the intersecting point between the optical axis thereof and the surface of the lens, is displaced at a speed equal to (1/2) of the speed of advancing the photocopying paper 10 along a straight line lying in a plane containing the optical axis of the lens 1 and at a right angle to the edge 3a of the V-shaped reflecting mirror 3, this straight line being inclined at 45° relative to the optical axis O of the lens 1. The V-shaped reflecting mirror 3 is displaced in such a manner that the edge 3a of this mirror 3 is displaced at a speed one-half said photocopying paper advancing speed in a plane containing the edge 3a and at a right angle to the optical axis 0. The reflecting mirror 7 is displaced in the direction opposite to that of advancing the photocopying paper 10 at the same speed with the photocopying advancing speed. It is noted that when the copying lens 1 is displaced at a speed one-half the photocopying paper-advancing speed in the same direction with that of the direction of the displacement of the V-shaped mirror and simultaneously in the direction of the optical axis 0 thereof, the resulting displacement is the same as that along the above described straight line inclined at 45° to the optical axis 0.

Since the copying lens 1, the V-shaped lens 3 and the movable reflecting mirror 7 are displaced as described above, the optical path between the surface of the original 9 and the copying lens 1 can be always maintained the same as the optical length between the lens 1 and the light sensitized surface of the photocopying paper 10 so that all of images upon the original 9 can be correctly focused upon the photocopying paper 10 without causing any undesirable distortion.

The displacement of the photocopying paper 10 is made along the plane containing the slit 5 and at a right angle relative to the edge 3a of the V-shaped reflecting mirror 3 (the optical axis 0 of the copying lens 1). Alternatively the photocopying paper 10 may be moved toward or away from the imaginary plane containing the optical axis 0 and the edge 3a. When the photocopying paper 10 is moved toward the imaginary plane, the movable reflecting mirror 7 is displaced for the side edge of the original 9 remote from the imaginary plane (that is, the position indicated by broken lines in FIG. 1). On the other hand, when the paper 10 is moved away from the imaginary plane, the moving reflecting mirror 7 must be started from the position closer to the imaginary plane (that is, the position indicated by the solid line in FIG. 1). The direction of the displacement or advancement of the paper 10 may be selected suitably depending upon the design of the photocopying machine or the like.

Figure 3:
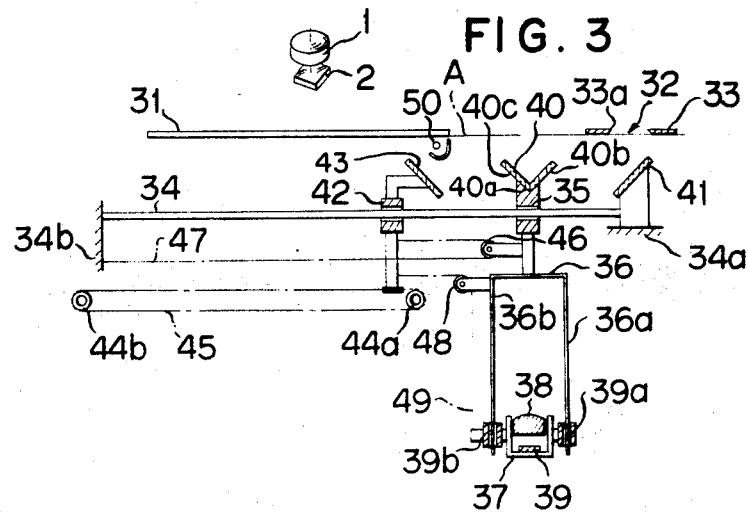
FIG. 3 is a schematic diagram illustrating one embodiment of a mechanism for driving the optical system of the present invention.

FIG. 3 is a schematic view illustrating one embodiment of a drive system for driving the slit exposure optical system of the present invention. A transparent original holder 31 and a shielding plate 33 having a slit 32 are placed upon a common plane A in closely spaced-apart relation with each other. An optical system carrying shaft 34 is disposed in parallel with the plane A at a right angle relative to the longitudinal edge 33a of the slit 33 and in spaced-apart relation from the plane A downwardly thereof. Both ends of the shaft 34 are stationarily journaled by the stationary members 34a and 34b respectively.

A sliding member 35 is slidable carried by the shaft 34 and at the lower end of a rod extending from the sliding member 35 is securely fixed a lens guide member 36. A photocopying lens 38 having a reflecting mirror 37 disposed at the rear surface of the lens is disposed in parallel with the plane A with the lens surface being directed upwardly. This lens 38 as well as its integral reflecting mirror 37 are securely fixed to a securing member 39. The guide member 36 has a pair of depending rods 36a and 36b in parallel with the optical axis of the lens 38, and sliding legs 39a and 39b securely attached to both sides of the supporting or securing member 39 are loosely fitted over the depending rods 36a and 36b respectively. The sliding member 35 carries a V-shaped reflecting mirror 40 having two reflecting surfaces which are directed toward the lens 38. The edge 40a, that is the intersecting line of two reflecting surfaces of the V-shaped reflecting mirror 40 is in a plane at right angles relative to the shaft 34 and the optical axis of the lens 38. The reflecting surfaces 40c and 40b of the V-shaped mirror 40 are inclined at 135° relative to the optical axis of the lens 38. To the stationary member 34a is fixedly secured a reflecting mirror 41 having a reflecting surface disposed in opposed and parallel relation with one of the reflecting surfaces 40b of the V-shaped reflecting mirror 40. Another sliding member 42 is carried upon the shaft 34 on the side of the V-shaped reflecting mirror 40 opposite to the stationary reflecting mirror 41. This sliding member 42 carries a movable reflecting mirror 43 having its reflecting surface disposed in opposed and parallel relation with the other reflecting surface 40c of the V-shaped reflecting mirror 40. The sliding member 42 is fixedly secured to a chain 45 lapped over sprockets 44a and 44b so that the sliding member 42 is reciprocated as the chain 45 is driven through the sprockets 44a and 44b by a suitable driving means not shown. To the rod extending from the sliding member 35 is rotatably fixed a pulley 46 over which is lapped a chain 47 one end of which is fixed to the stationary member 34b and the other end of which is fixed to the sliding member 42. The guide member 36 is provided with a pulley 48 over which is lapped a chain 49 whose one end is securely fixed to the sliding member 42 while the other end is fixed to the sliding member 39b. The above chains, sprockets and pulleys may be arranged and disposed on the same members other than the above described arrangement unless they are not in contact with the other members. It is preferable that the chains 45 and 47 extend in parallel with the shaft 34 while the chain 49 extends in parallel with the shaft 34 until it reaches the pulley 48 and therefrom extends downwardly in parallel with the optical axis of the lens 38. The sprocket 44b is rotated in the counterclockwise direction when the photocopying paper is advanced in the right direction in FIG. 3 so that the chain 45 is driven at the same speed with that of the photocopying paper. On the other hand, when the paper is advanced toward the left, the sprocket 44b is driven in the counterclockwise direction. The above is the case when the sliding member 42 is fixed to the upper side of the chain 45. When the sliding member 42 is fixed to the lower side of the chain 45, the above conditions are reversed. When the chain 45 moves at the same speed of that of the photocopying paper, the sliding member 42 carrying the movable reflecting mirror 43 is caused to move at the same speed in the same direction. Since the ends of the chain 47 are fixed, the sliding member 35 is caused to move in both directions at a speed one-half that of the photocopying paper. Since one end of the chain 49 is also fixed to the sliding member 42, the chain 49 is caused to move at the same speed with that of the sliding member 42. But the sliding member 35 is caused to move in the same direction at a speed one-half that of the photocopying paper, so that the copying lens 38 is displaced through the pulley 48 attached integrally with the sliding member 35 at a speed one-half of that of the chain 45 in the direction of the optical axis. Therefore, it is apparent that the optical length between the photocopying lens 38 and the surface of the original can be always maintained the same as the optical length between the light sensitized surface of the copying paper and the lens 38 so that the images upon the original can be focused correctly upon the moving photocopying paper without any distortion of the images.

The sliding members 35 and 42 and the supporting member 39 are imparted with a tendency to return to their normal or initial positions by means of suitable springs or the like in order to maintain accurate movements of these members.

According to the slit exposure system according to the present invention which enables to focus the images of an original upon a moving photosensitive paper, the continuous exposure can be effected upon a rolled photocopying paper or the like so that photocopying operation can be increased to a great extent. Furthermore in the slit exposure system of the present invention, opposed to the conventional slit exposure system, the provision of large photosensitive paper advancing and stopping means or a photocopying paper supporting stand having a wide area is not required so that the photocopying machine or the like can be accordingly made simple in construction and compact in size. Furthermore, according to the slit exposure system of the present invention, it is possible to arrange the original holder in closely spaced apart relation with the copying paper supporting stand in the same plane, the (optical) relative position therebetween can be easily attained without any special means.

The present invention has been so far described in detail with particular reference to one embodiment thereof, but it will be understood that variations and modifications can be effected without departing the true spirit of the invention as described hereinabove and as defined in the appended claim.

I claim:

1. A slit exposure device for copying machines comprising an original holder;
    a shield plate for a copy paper, said plate including a slit to permit reflected light to be directed onto said copy paper, said slit and said original holder disposed in parallel planes;
    a movable reflecting mirror disposed in opposed relation to said original holder and adapted to reciprocate parallel to said original holder;
    a stationary reflecting mirror disposed in opposed relation to said slit;
    a V-shaped reflecting mirror having two reflecting surfaces extending from an intersection therein for reflecting light with respect to said movable and stationary reflecting mirrors, said V-shaped reflecting mirror mounted to reciprocate parallel to said original holder;
    a photocopying lens having an optical axis extending through said intersection of said V-shaped reflecting mirror, said optical axis being perpendicular to the parallel planes of said original holder and said plate, said lens having a reflecting mirror formed integrally with the rear face thereof, said lens disposed in a plane which is perpendicular to the optical axis;
    said lens and said mirrors arranged in optical relation to each other to form an optical system; and
    said V-shaped mirror and said lens being movable at a speed one-half of the speed of said movable mirror in the same direction therewith, said lens further being movable along its optical axis toward said V-shaped mirror at the same speed as the speed of said movable mirror whereby the optical length between said original holder and said lens is always maintained equal to that be between said lens and said slit for exposure.

2. A slit exposure device according to claim 1 in which the reflecting surface of said movable mirror is opposed to the original holder at 45°;
    said stationary reflecting mirror is opposed to said slit for exposure at 45°;
    said reflecting surfaces of said V-shaped reflecting mirror are mounted at 45° relative to each other; and
    the reflecting surface of said movable reflecting mirror is in parallel with one of the reflecting surfaces of said V-shaped reflecting mirror and is at 135° relative to the optical axis of said copying lens.

3. A slit exposure device according to claim 1 in which
    said V-shaped reflecting mirror and said movable reflecting mirror are slidably carried by a guide element extending in parallel with said original holder;
    said lens is slidably carried by a guide member fixed to a mounting member associated with said V-shaped reflecting mirror;
    a first drive chain is provided for reciprocating said movable reflecting mirror;
    a second drive chain wrapped over a first pulley mounted on said mounting member of said V-shaped reflecting mirror has its one end fixed to said mounting member and its other end fixed to the machine; and
    a third drive chain wrapped over a second pulley of said mounting member has its one end fixed to said mounting member ans its other end fixed to a supporting member of said lens;
    whereby said movable reflecting mirror is moved by said first drive chain and said V-shaped reflecting mirror and said lens are moved by said second and third drive chains in cooperation with said first drive chain.

UNITED STATES PATENT OFFICE
CERTIFICATE OF CORRECTION

Patent No. 3,609,024      Dated September 28, 1971

Inventor(s) Shigeru Suzuki

It is certified that error appears in the above-identified patent and that said Letters Patent are hereby corrected as shown below:

Column 2, line 68,    change "(1/2)" to -- (1/$\sqrt{2}$) --;

Column 6, line 1,    delete "be";

Column 6, line 29,    change "ans" to -- and --.

Signed and sealed this 23rd day of May 1972.

(SEAL)
Attest:

EDWARD M. FLETCHER, JR.      ROBERT GOTTSCHALK
Attesting Officer      Commissioner of Patents Case 1770-70